United States Patent [19]

Magidson et al.

[11] 4,013,750
[45] Mar. 22, 1977

[54] METHOD FOR MAKING BRASSIERE PAD PREFORMS

[75] Inventors: Herbert Magidson; Otto L. Huber, both of Beverly Hills; Helmut Hennrich, Manhattan Beach, all of Calif.

[73] Assignee: Moldex/Metric, Inc., Culver City, Calif.

[22] Filed: June 9, 1975

[21] Appl. No.: 585,235

Related U.S. Application Data

[62] Division of Ser. No. 473,735, May 28, 1974, Pat. No. 3,947,207.

[52] U.S. Cl. .............................. 264/136; 264/134; 264/292; 264/324
[51] Int. Cl.² .................................. B29C 11/00
[58] Field of Search ............ 425/398; 264/324, 292, 264/134, 136

[56] References Cited

UNITED STATES PATENTS

| | | | |
|---|---|---|---|
| 1,668,349 | 5/1928 | Baum | 264/324 X |
| 2,924,852 | 2/1960 | Michalko | 264/292 |
| 2,963,744 | 12/1960 | Cooper | 264/292 |
| 3,417,755 | 12/1968 | Howard | 264/324 X |
| 3,502,083 | 3/1970 | Howard | 264/324 X |
| 3,597,800 | 8/1971 | Silverman | 425/412 X |
| 3,880,561 | 4/1975 | Ferro | 425/412 X |
| 3,891,378 | 6/1975 | Belmuth | 425/412 X |

Primary Examiner—Richard R. Kucia
Attorney, Agent, or Firm—Spensley, Horn & Lubitz

[57] ABSTRACT

A method for fabricating a conical seamless bra pad preform for subsequent molding into a finished pad. The material used is fiberfill or the like and a blank, cut from such a sheet, or from a sandwich of two sheets, and is indented by a conical member which has pins spaced over the surface of the cone for engaging the material. Variable thinning of the material is achieved by the action of the pins in engaging the material successively. A second embodiment involves a series of coaxial rings to grasp the blank. Non-uniform displacement of the ringsets causes the desired uneven stretching of the blank.

7 Claims, 14 Drawing Figures

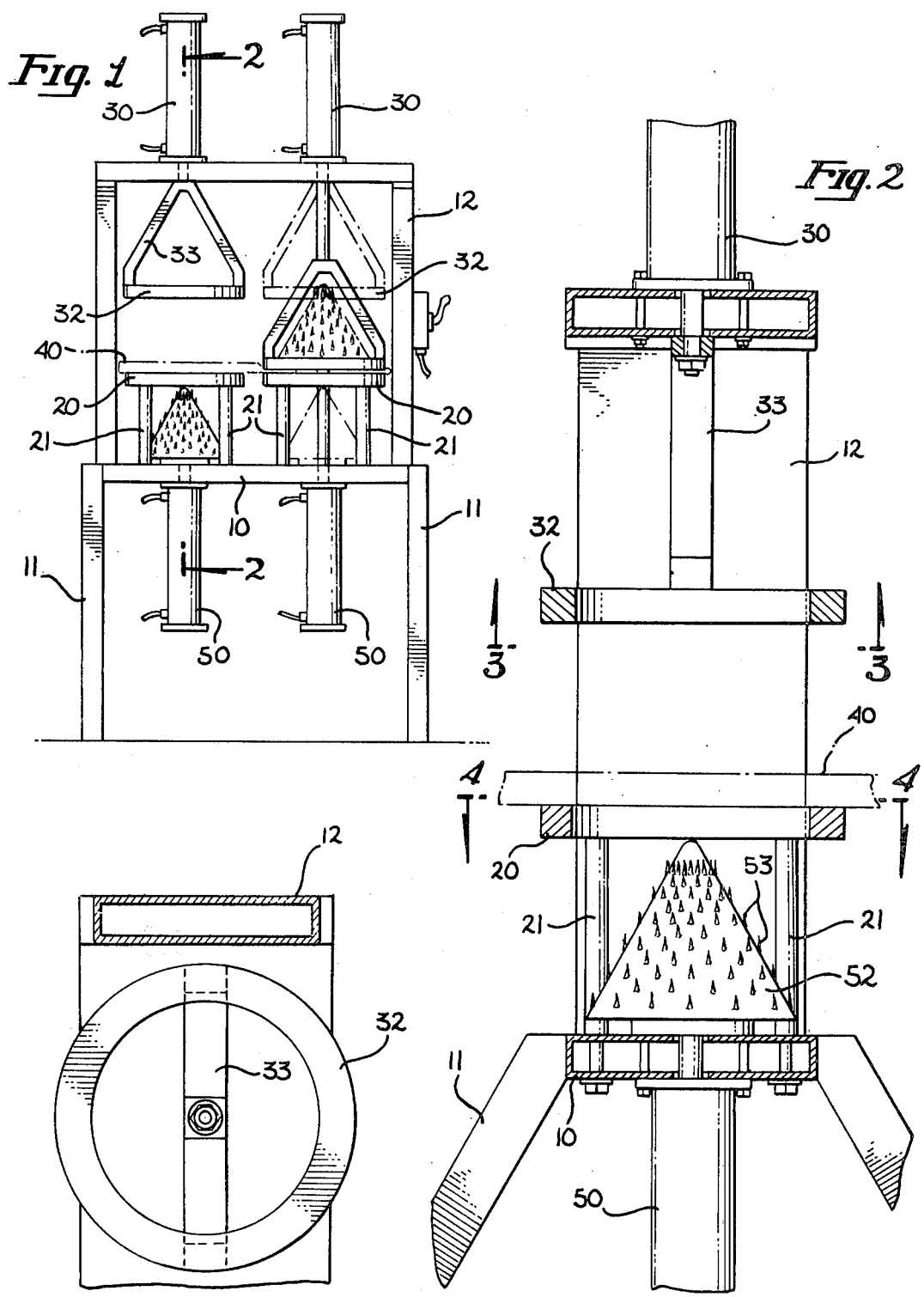

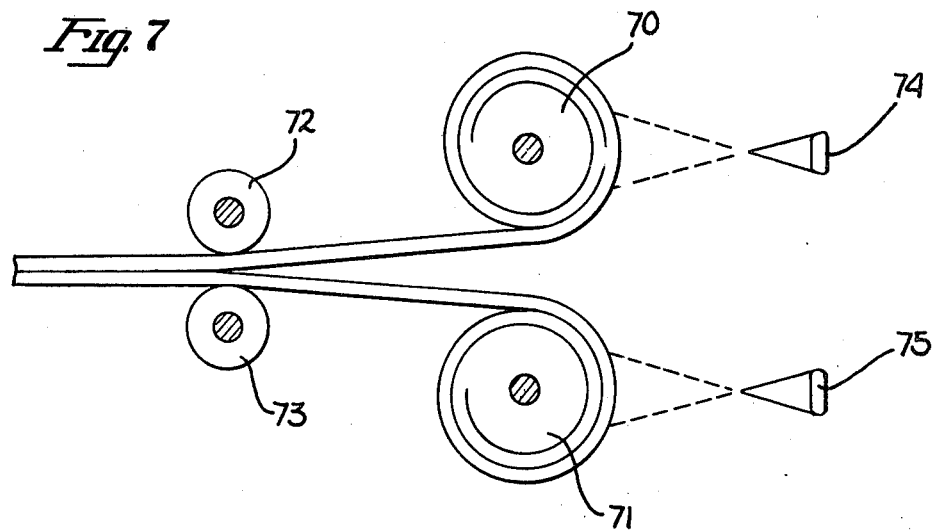
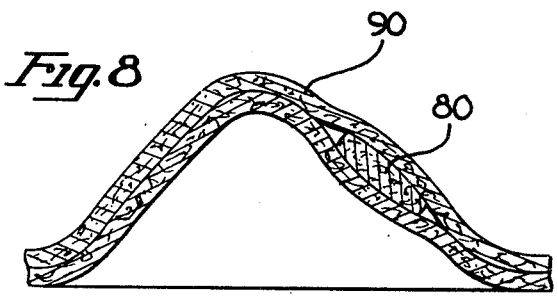
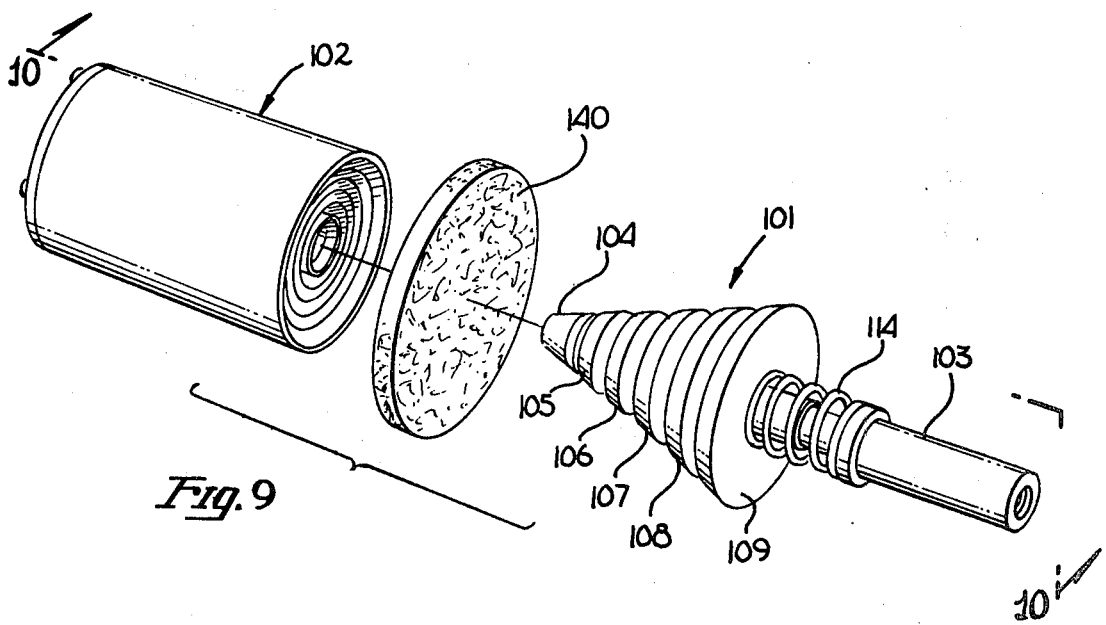

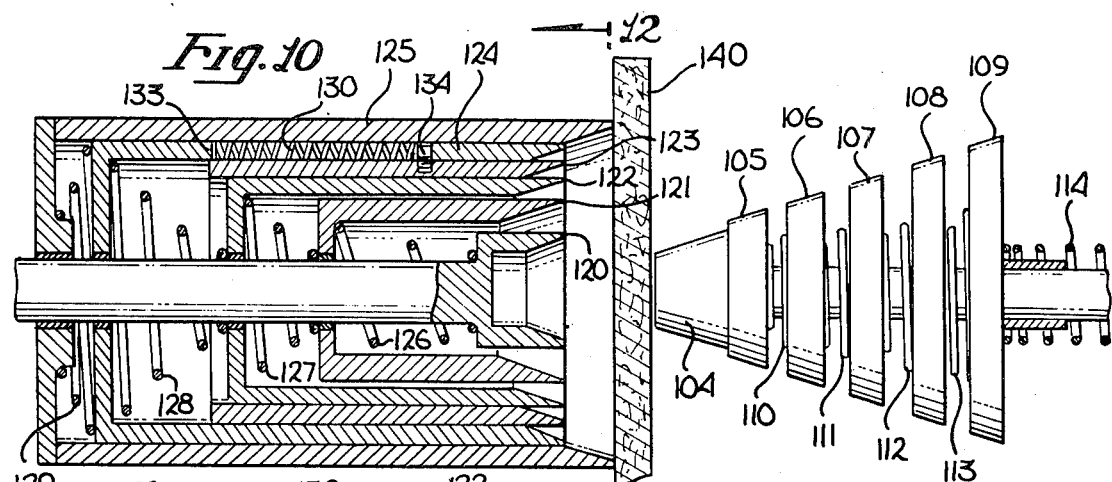
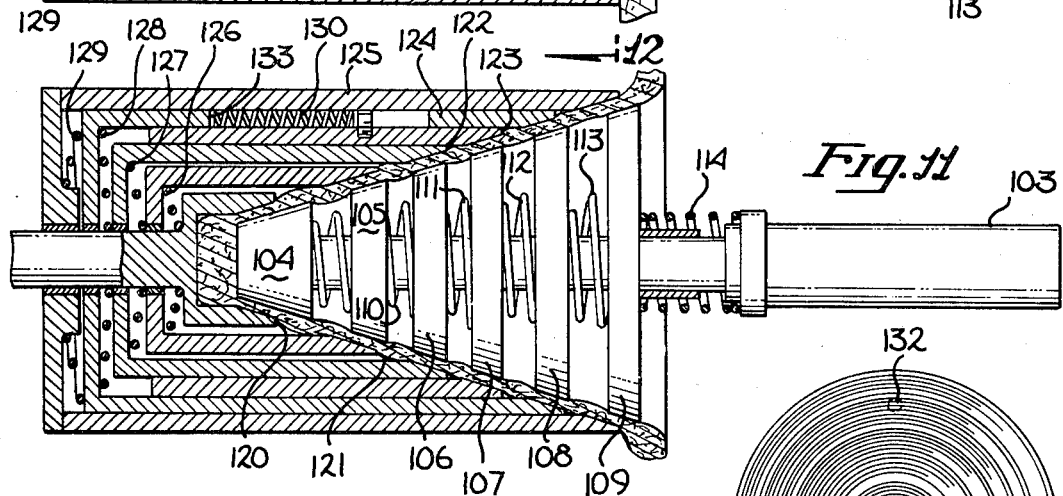
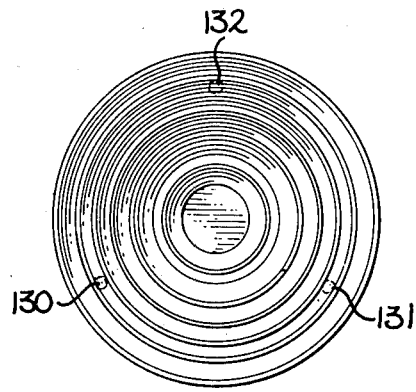
Fig. 12
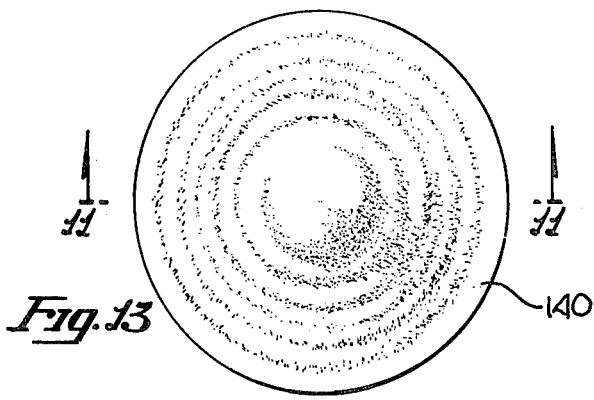
Fig. 13
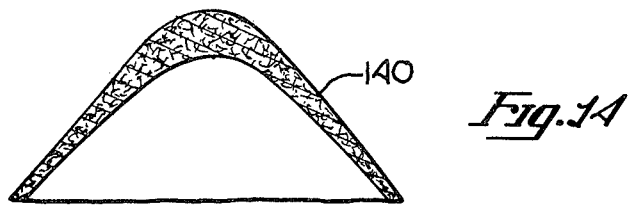
Fig. 14

METHOD FOR MAKING BRASSIERE PAD PREFORMS

This is a division of application Ser. No. 473,735, filed May 28, 1974, U.S. Pat. No. 3,947,207 issued Mar. 30, 1976.

BACKGROUND OF THE INVENTION

1. Field of the Invention

This invention relates to the fabrication of molded brassiere pads.

2. Prior Art

Brassiere pads molded from fiberfill material of varying thicknesses have been made for many years. Prior art processes have suffered from thinning at the apex while forming the pad to the required contour and consequently have resulted in poor washability. In order to avoid thin spots or tears at the apex of the pad, it has been common to use a cut and sewn or preformed blank of material having roughly the finish contours desired. Such preforms have been made, for example, by cutting a pie-shaped segment out of a flat blank and sewing or gluing the cut edges to form a conical shape. Another method of fabrication involves making a single cut part way across the pad and overlapping the material on each side of the cut, followed by gluing or sewing.

These methods avoid the problem of thinness at the apex of the pad. However, the glued or sewn seam pad is always visible and felt through the outer fabric which is generally applied over the inside and outside thereof. The purpose of a bra pad is to enhance the apparent size of the breast without making the presence of a pad obvious. In order to accomplish this, the pad should be relatively heavy at the apex and thin gradually to the periphery. The invented method thins out selected portions of the blank, leaving the apex heavy, and at the same time forms the blank into the proper conical shape for insertion into a heated mold for final forming, resulting in a totally seamless pad which can be lined totally to create a sandwich therewith.

The fiberfill material practicing the invented method pad preform is a non-woven fibrous batting material which is comprised of relatively short polyester fibers randomly packed and bound together with an acrylic resinous binder. The fibers are loosely packed and are compressed in the pad molding operation so that the desired softness of the pad is obtained. In order for the material to retain the desired density and the form of the mold, the mold is heated, typically from 300° to 450° F so that the binder resin will cure with the fibers compressed in the mold. The resin, however, is 75 to 80% cured when the fiberfill sheet is received. In the drawing operation, prior to molding the bonding between the individual fibers is partially broken, resulting in weakening of the fiberfill pad, so that it has a reduced life, especially under continued washing causing, the contour shape to be lost. The invented method overcomes this problem by introducing additional acrylic resin, of the same type as used to bond the fibers in the original sheet, and which rebonds any bonds broken in the curing cycle. The additional bonding agent, when cured, also reinforces unbroken bonds in the sheet.

Another prior art approach involves the use of a flat sandwich of fiberfill material which is placed between two layers of liner material. This sandwich is then placed in a two-part mold where it is first shaped thereby in a bra shape mold. In this process the fibers of the fiberfill and the molding agent break down. Additionally, the apex flattens out, thus still leaving the basic problems unresolved.

SUMMARY OF THE INVENTION

In the manufacture of brassiere pads from fiberfill or the like material, the usual procedure is to fabricate a conically shaped preform approximating the final desired shape of the pad by sewing or gluing sheet material. Then the final pad is molded in a two-part heated mold. The preform is used in order to avoid the stretching and consequent thinning at the apex of the pad which would occur if a flat piece of material were inserted in the heated mold. The reverse situation is preferable, that is, the pad should be thinned near the periphery and left relatively heavy at the apex.

The method of this invention accomplishes the desired result by driving a conically shaped member into a blank of fiberfill or the like material as it is held by a pair of clamping rings. Variable stretch in the conical indent is achieved by spacing a plurality of pins on the surface of the cone such that those near the apex of the cone engage the blank material first and thus stop any stretching in the material between the apex and the engaged pins. As the cone penetrates deeper more pins are engaged and further stretch (with consequent thinning of the material stretched) is confined progressively to the areas closer to the periphery. The result is a conical preformed pad blank with little or no thinning at the apex and more progressively thinner material closer to the periphery.

In a second embodiment portions of the blank are progressively grasped and stretched, starting with the apex of the preform. The desired extra thinning at the periphery is accomplished by varying relative spring stiffnesses within the apparatus.

The difficulty in obtaining a long lasting pad using blanks formed from flat sheet fiberfill has persisted using prior art methods, as the fiber bonds are partially destroyed in the drawing process. An improvement in this characteristic is achieved by adding uncured acrylic resin to the blank which upon curing in a three-dimensional mold adds to the bonding between the fibers of the fiberfill and counteracts deterioration of existing bonds.

BRIEF DESCRIPTION OF THE DRAWINGS

FIG. 1 is a front view of an apparatus for forming brassiere pad preforms in accordance with the method of this invention.

FIG. 2 is an enlarged cross-sectional view of the apparatus of FIG. 1, taken along 2—2, the apparatus being in the open condition.

FIG. 3 is a view looking upward into one of the clamping rings of the apparatus taken at 3—3 of FIG. 2.

FIG. 7 is a cross-sectional view of an apparatus for making laminated material to be used to form bra pad preforms.

FIG. 8 is a cross-sectional view of a bra pad preform suitable for fabricating push-up bra pads.

FIG. 9 is a perspective view of a second embodiment of apparatus for the present invention.

FIG. 10 is a cross-sectional view of the apparatus of FIG. 9 in the open position.

FIG. 11 is a cross-sectional view of the apparatus of FIG. 9 in the closed position.

FIG. 12 is an end view of the female portion of the dieset of the second embodiment of the invention taken at 10—10 of FIG. 9.

FIG. 13 is a plan view of a preformed bra pad made on the dieset of FIG. 9.

FIG. 14 is a cross-sectional view of the bra pad of FIG. 13.

DETAILED DESCRIPTION OF THE INVENTION

Figure 4:
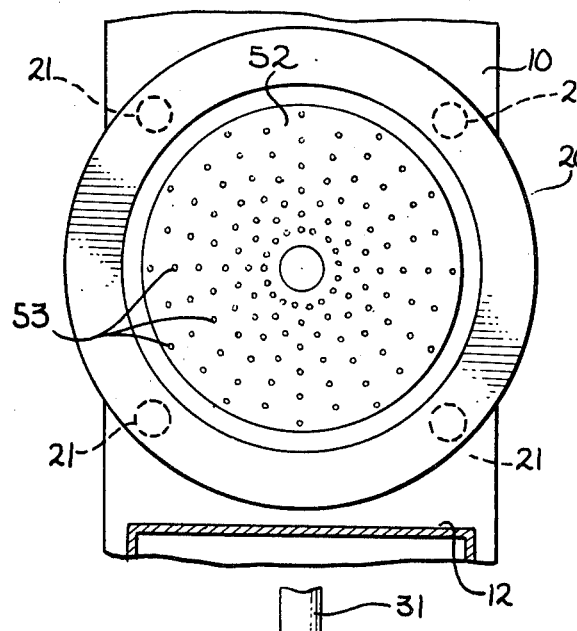
FIG. 4 is a view looking downward onto the forming cone of the apparatus taken at 4—4 of FIG. 2.
Figure 5:
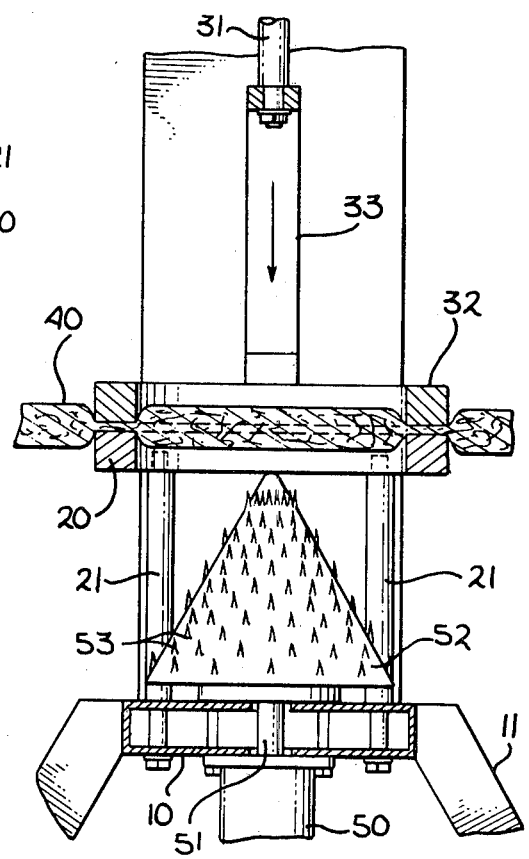
FIG. 5 is a view similar to FIG. 2 but with a blank clamped between the clamping rings.
Figure 6:
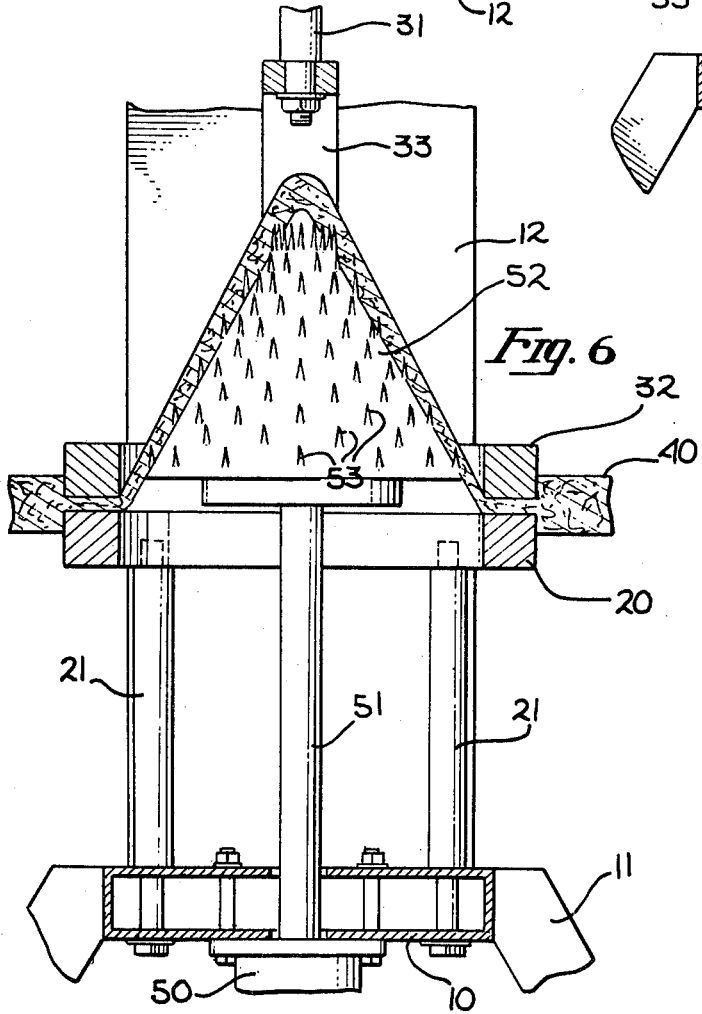
FIG. 6 is a view similar to FIGS. 2 and 5 but with the forming cone in its upward position showing a blank formed.

Referring first to FIG. 1 where a two-position apparatus for preforming bra pad blanks is shown. The two positions are identical and one is shown in the closed position with a preformed blank therein, while the other position is shown open, ready to form a blank. The apparatus will be described in the singular and the same reference designations will be used for the same part in either position. The forming apparatus is mounted on a base member 10 which, for convenience may be supported on legs 11. A frame 12 over the base member 10 carries a mechanism for clamping the blank during the forming operation. A clamp ring 20 is mounted on base 10 but is spaced from it by spacers 21 so that blank material being held by the clamp ring will clear the mechanism positioned below it. On frame 12, directly above clamp ring 20 is air cylinder 30 having a piston rod 31. A second clamp ring 32 which mates with clamp ring 20 is mounted on piston rod 31 through yoke 33.

In operation, a blank of unformed bra pad material 40 is placed on clamp ring 20 and air cylinder 30 is actuated which drives clamp ring 32 against clamp ring 20 securely holding the blank between them. Subsequent forming of the blank is accomplished while the blank is thus held between clamp rings 20 and 32.

On the base member 10, substantially coaxial with air cylinder 30 and clamp rings 20 and 32 is a second air cylinder 50 having a piston rod 51. The travel of piston rod 51 is such that when it is extended, cone 52 assumes the position such that an extension of the surface of the cone would approximately intersect the inner diameters of clamp rings 20 and 32 at the clamping surfaces.

The surface of cone 52 contains a plurality of upward facing pins 53 which are long enough to engage the bra pad material and allow the material to stretch without tearing. A length of about one-half to three-quarters the thickness of the blank material is a suitable length. The pins may be made of any suitable rigid material, for example, steel, and may be pressed into holes in the cone, swaged or otherwise held in place. The spacing of the pins affects the amount of thinning of the material; the closer the spacing, the less thinning. In the area where thinning is not desired, that is, around the apex, the pins are closely spaced and as more thinning is desired in the regions away from the apex, the pins are spaced further apart.

The sequence of steps in preforming a bra pad starts with laying an unformed flat blank of material on top of clamp ring 20. Fiberfill in a single layer may be used but a laminated two-layer type material which is to be described below, may also be used.

Air cylinder 30 is then actuated which causes clamp ring 32 to descend onto the blank so that the blank is securely held between clamp rings 20 and 32. The actuation of air cylinder 50 causes cone 52 to push the blank 40 into a conical shape.

As cone 52 travels upward causing the blank to deform, the first contact, with the rounded apex of cone 52, deflects the blank without causing substantial stretching of the material. The first row of pins 53 on cone 52 engages the blank after only a small deflection. At this point, very little stretch has been imparted to the blank and the engagement by the pins effectively stops any further stretching of the material between the engaged pins and the apex. As the cone travels further, the material begins to stretch and pins further down the cone engage the material. As the pins engage, the material remaining between the engaged pins and the inner clamping diameter of clamp rings 20 and 32 stretches. Since there is progressively less engaged material there is proportionally more stretch imparted to the material as the cone travels down. The result is that essentially no stretch is imparted to the material at the apex of the pad and progressively more stretch, and consequent thinning of the material, is imparted to the pad away from the apex. This is the desired configuration.

When the air cylinders 30 and 50 are released, the stretched pad retains the shape imparted during the forming operation and is removed from the cone.

The completed preformed pad is then placed in a two-piece heated mold, as is common in the art, and cured into the final form of the pad. The molding operation compresses the material to the density desired, that is, to the density of material which has a softness which approximates the softness of the human body. The resinous binder which holds the fibers of the material together is not completely cured when the fiberfill sheet is received and the subsequent heating of it with the added resin, typically to 300° to 450° F, while in a mold, completes the cure and results in a pad having the contours of the mold, which contours will be retained.

A second embodiment of the present invention is illustrated in FIGS. 9 through 14. In this embodiment the dieset comprises a male portion 101 and a female portion 102. Shank 103 carries a series of tapered rings 104 through 109 separated by springs 110 through 113. The springs are relatively stiff and hold the tapered rings so that their peripheries form sections of a cone. Ring 104 is secured to shank 103 but the remainder of the rings are free to move along the shank and are urged toward ring 104 by spring 114.

The female dieset portion 102 includes a set of nested cup-shaped parts 120 through 125. The cups have tapered rims which will mate with the tapered rings 104 through 109. Each cup is spring-supported by the next larger cup so that in the free position the rims of the cups are all substantially even. Springs 126 through 129 show one springing method which has been found to be satisfactory. Another springing method is illustrated by springs 130 through 132 which support cup 123 from cup 124. These are small diameter coil springs which are in cutout portions of cup 124. In FIG. 7 spring 130 can be seen in detail. It bears against cup 124 at 133 and screw 134 screwed into cup 123.

In operation a blank pad 140 of fiberfill material is placed between the two portions of the dieset and the dieset closed. As the dieset closes, tapered disc 104 engages cup 120 grasping the center of blank 140 therebetween. Further closing compresses spring 126 and ring 105 engages cup 121. At this point spring 11 begins to compress and ring 105 moves back from its position against ring 104. This movement causes stretching of pad 140 in the region between the portion grasped by ring 104 and that grasped by ring 105. Progressively, rings 106, 107, 108 and 109 grasp parts of the blank 140 and cause the blank to be stretched and formed into a roughly conical shape. The amount of stretch depends upon the relative strength of springs 110 through 114 with respect to springs 126 through 132.

As in the first embodiment described, uniform stretching of the material may be obtained. There is no tendency to overstretch the apex since that portion is firmly held between ring 104 and cup 120. By varying the relative spring strengths any desired distribution of stretch may be obtained. For example, if spring 113 were made relatively weaker, the stretch near the periphery would be increased.

As in the first embodiment described, the preformed blank is then placed in a heated two-part mold for the finishing operation.

While the use of a flat sheet of fiberfill material or the like has been referred to above as a suitable material for making the preformed blank described herein, a laminated sheet has also been found useful. The method of making the laminated sheet is illustrated in FIG. 7. The starting material is sheet fiberfill, or the like, having half the desired blank thickness. This material is shown in FIG. 7 on two supply rolls 70 and 71. The width of the rolls can be just one preform width or wider, in which case blanks of the desired size can be cut from the finished blank material.

As the material comes off the supply rolls 70 and 71, nozzles 74 and 75 spray a polyurethane adhesive on one surface of each strip, covering the mating surfaces of the sheets with adhesive, which sheets have previously been permeated with the acrylic resin. The supply rolls 70 and 71 are arranged so that the strips from each come together between rollers 72 and 73 which apply a light pressure to the laminate, perhaps 2 to 4 ounces per foot of width. The pressure is not critical but should be enough to cause the strips to stick lightly.

After the strips are contacted and stuck, blanks of the desired size may be cut from the laminated strip.

The use of a laminated sheet also allows the addition of an auxiliary piece of material between the laminations which increases the thickness of the blank in one part of the blank for the purpose of fabricating a bra pad with push-up action. Bra pads having push-up action are described in the co-pending application Ser. No. 412,666 filed Nov. 5, 1973, by Herbert Magidson, Otto L. Huber and Helmut Heinrich. The auxiliary piece 80, as illustrated in FIG. 8 is typically circular but need not be. It is made of similar material as the blank but its initial thickness may be more or less, depending upon the extent of the push-up action desired in the finished pad.

While a useful bra pad can be made as described above, some difficulty with the ability of the pad to withstand repeated washings without losing shape can be encountered. This is because the resin binder in fiberfill material, as received, is some 75 to 80% cured and when the material is subsequently stretched, compressed and heated during the bra pad fabrication, many of the bonds between the individual fibers are weakened or broken. To counteract this tendency, an additional step is added to the process. Prior to the curing of the pad, and preferably before stretching the material into the conical preform shape, fresh acrylic resin, of the same kind as is used in bonding the fiberfill fibers is sprayed onto the sheet using a relatively high pressure so that the resin will permeate the sheet. This additional resin, upon being cured, reinforces the fiber bonds and adds somewhat to the stiffness of the finished pad. The quantity of resin added can be varied to suit the final stiffness desired.

It is typically desirable to cover and/or line the bra pad with a light, smooth fabric such as, for example, tricots, laces, etc. This can be accomplished by spraying the inner, outer, or both surfaces of the pad preform, as desired, with a polyurethane adhesive and bonding the liner and/or liners to the pad at the same time that the pad itself is being molded and cured. Polyurethane adhesive is heat polymerizing so that a single heating in a two-piece mold will simultaneously polymerize the polyurethane adhesive bonding the molded liner to the bra pad.

What is claimed is as follows:

1. A method of preforming seamless brassiere pads fabricated from sheet fibrous batting material which comprises:
   a. clamping said sheet of fibrous batting material at the periphery of said pad; and
   b. driving a substantially conical member into said sheet, said conical member having a plurality of pins extending from the surface of said member and aligned in the direction of motion of said member said pins being distributed over substantially all of the surface of said member with the exception of an area surrounding the apex of said member whereby when said conical member is driven into said sheet, a predetermined amount of stretch will be imparted to said sheet in the region of said sheet in contact with the apex portion of said member and stretching of the remainder of said sheet will be progressively arrested as said pins progressively engage said sheet.

2. The method of claim 1 and further including the step of applying acrylic resin to said sheet of fibrous batting material either prior to the clamping and driving steps or subsequent thereto.

3. The method of claim 1 where said pins are distributed over substantially all of the surface of said conical member whereby the stretching of said sheet will be progressively arrested upon engagement with said pins.

4. The method of claim 1 where the closest of said pins to said apex form a substantially circular pattern around said apex whereby a predetermined amount of stretch will be imparted to said sheet at said apex upon driving said conical member into said sheet.

5. The method of claim 1 where said pins disposed farther from the apex of said conical member are spaced generally farther apart whereby areas of said sheet contacting pins more remote from said apex will be stretched more upon driving said conical member into said sheet.

6. The method of claim 1 where said pins are spaced farther apart over areas of said conical member corresponding to areas of said pad where greater stretching is desired.

7. The method of claim 1 where said sheet is clamped between a pair of rings, said rings being forced together by the action of a fluid driven piston.

* * * * *